United States Patent
Hayes et al.

(10) Patent No.: US 6,225,938 B1
(45) Date of Patent: *May 1, 2001

(54) UNIVERSAL REMOTE CONTROL SYSTEM WITH BAR CODE SETUP

(75) Inventors: Patrick H. Hayes, Mission Viejo; Marcus Escobosa, Placentia; Fusheng Frank Chen, Santa Ana, all of CA (US)

(73) Assignee: Universal Electronics Inc., Cypress, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,069

(22) Filed: Jan. 14, 1999

(51) Int. Cl.[7] .................................................. G08C 19/12
(52) U.S. Cl. .......................... 341/176; 345/169; 359/142; 359/146; 235/462.45; 235/462.46
(58) Field of Search ........................... 341/176; 345/169; 359/142, 145, 146, 148; 235/472.01, 472.02, 462.13, 462.45, 462.46

(56) References Cited

U.S. PATENT DOCUMENTS

| | | |
|---|---|---|
| 4,626,848 | 12/1986 | Ehlers . |
| 4,746,919 | 5/1988 | Reitmeier . |
| 4,959,810 | 9/1990 | Darbee et al. . |
| 5,255,313 | 10/1993 | Darbee . |
| 5,519,457 | 5/1996 | Nishgaki et al. . |
| 5,552,917 | 9/1996 | Darbee et al. . |
| 5,726,645 | 3/1998 | Kamon et al. . |
| 5,869,819 | 2/1999 | Knowles et al. . |
| 5,909,183 | 6/1999 | Borgstahl et al. . |
| 5,959,539 | 9/1999 | Adolph et al. . |
| 5,962,839 | * 10/1999 | Eskildsen ........................ 235/470.01 |
| 5,965,864 | * 10/1999 | Iwaguchi et al. ............... 235/472.01 |
| 6,065,880 | * 5/2000 | Thompson ............................. 385/88 |

FOREIGN PATENT DOCUMENTS

| | | |
|---|---|---|
| 0331257 | 9/1989 | (EP) . |
| 11143515 | 5/1999 | (JP) . |
| 98/00933 | 1/1998 | (WO) . |

OTHER PUBLICATIONS

IBM Research Disclosure, "Universal Interactive Device", vol. 41, No. 410, Jun. 1, 1998, United Kingdom, No Page #.

* cited by examiner

Primary Examiner—Michael Horabik
Assistant Examiner—Timothy Edwards, Jr.
(74) Attorney, Agent, or Firm—Mark R. Galis; Gary R. Jarosik; John E. Hyatt

(57) ABSTRACT

A universal remote control system with bar code activated set up wherein the device to be controlled such as a TV, VCR or other consumer electronic product, and the associated remote control unit are pre-programmed and adapted to automatically reconfigure the remote control unit to communicate with a device to be controlled.

3 Claims, 6 Drawing Sheets

UNIVERSAL REMOTE CONTROL SYSTEM WITH BAR CODE SETUP

BACKGROUND OF THE INVENTION

This invention relates generally to infrared remote control systems and, more particularly, to universal remote control units wherein one remote control unit can control a number of various types of devices such as televisions, video cassette recorders (VCRs), cable boxes, disk players and other electronic equipment. The invention provides an improvement to such universal remote control systems for enabling the devices and remote control unit to be ready to communicate with each other.

Most manufacturers provide remote controls to control their equipment, and equipment of different manufacturers are often controlled with different remote control units. To minimize the number of individual remote control units a user requires, universal remote control units have been developed. Accordingly, infrared remote control units for controlling various functions of television receivers, VCR's, and auxiliary electronic equipment have become quite widespread in recent years. U.S. Pat. No. 5,255,313 issued to Darbee and assigned to Universal Electronics Inc., and U.S. Pat. No. 5,552,917 issued to Darbee et al and assigned to Universal Electronics Inc. disclose universal remote control systems.

In a common method of setting up and using a universal remote control unit, infrared ("IR") function codes that are to be learned and used are made available from the device to be controlled. The consumer or user is required to program or adapt the universal remote control unit to control the user's particular equipment, such as television sets, VCR's, entertainment media, and other devices. Alternatively, codes can be preprogrammed into the remote control to communicate with the equipment to be controlled. In either case, the programming and adaption of the universal remote control to the user's particular equipment can be demanding, exacting and generally frustrating for many users.

SUMMARY OF THE INVENTION

This invention provides a universal remote control system wherein the equipment to be controlled and the associated remote control unit are preprogrammed and adapted to automatically configure or reconfigure the remote control unit to communicate with the equipment to be controlled by means of a bar code label, in other words, a label on the equipment to be controlled is used to perform the setup of the remote control.

The foregoing features and advantages of the present invention will be apparent from the following more particular description of the invention. The accompanying drawings, listed hereinbelow, are useful in explaining the invention.

DESCRIPTION OF THE INVENTION

The present invention relates to a universal remote control system with bar code activated setup capability. As stated above, universal remote control units are prevalent in the market place. Each of these remote control units are used to control various types and brands of electronic devices (equipment) in the consumer's or user's home such as the TV, the VCR, cable box, disk player, etc. However, the prior art universal remote control systems have to be programmed or adapted by the user to control his particular equipment. Often this programming and adaptation becomes quite difficult and frustrating to the user. As stated above, the present invention is directed to providing a system wherein the devices to be controlled and the remote control unit are readied to enter into communication with each other by means of the user "swiping" the remote control over a bar code label on the device, without requiring the user to program or code in a set of commands; that is, the remote control unit can be setup rapidly and with minimal effort on the part of the user.

Figure 1:
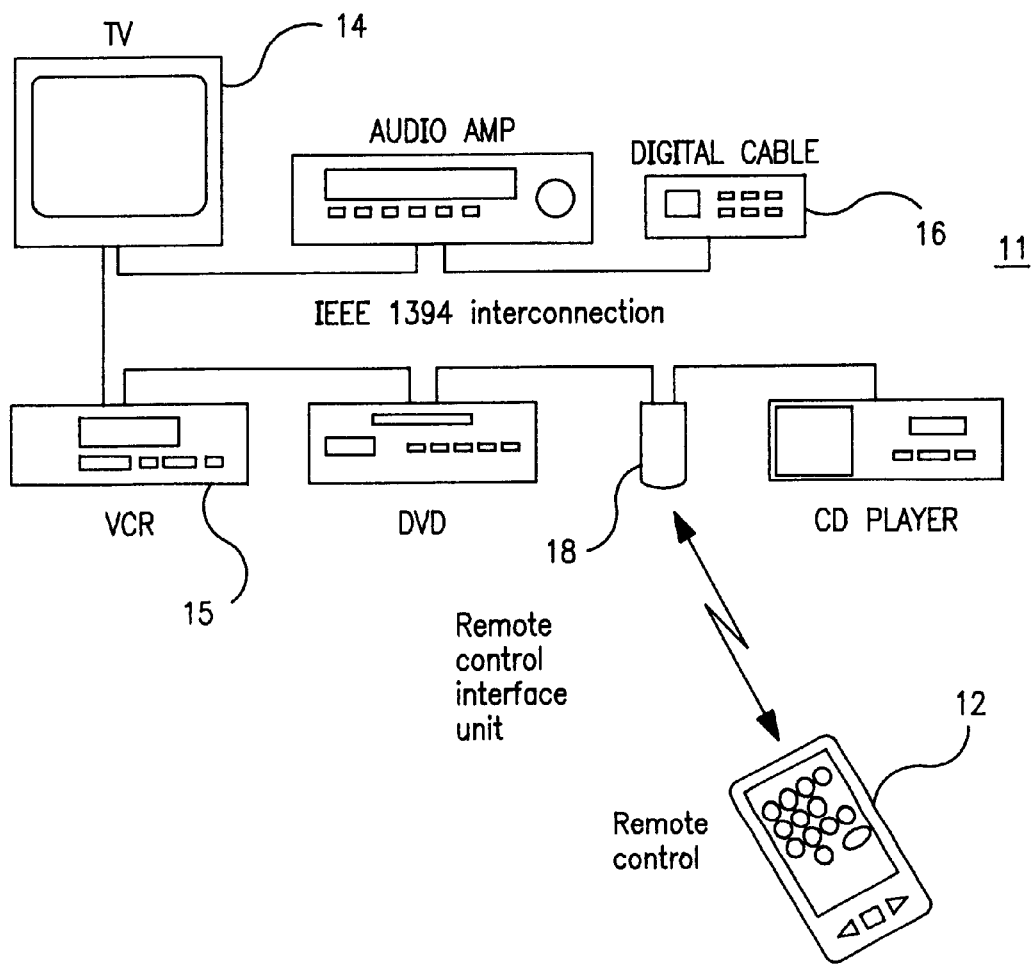
FIG. 1 is a plan view of an inventive universal remote control unit with bar code setup capability.
Figure 2:
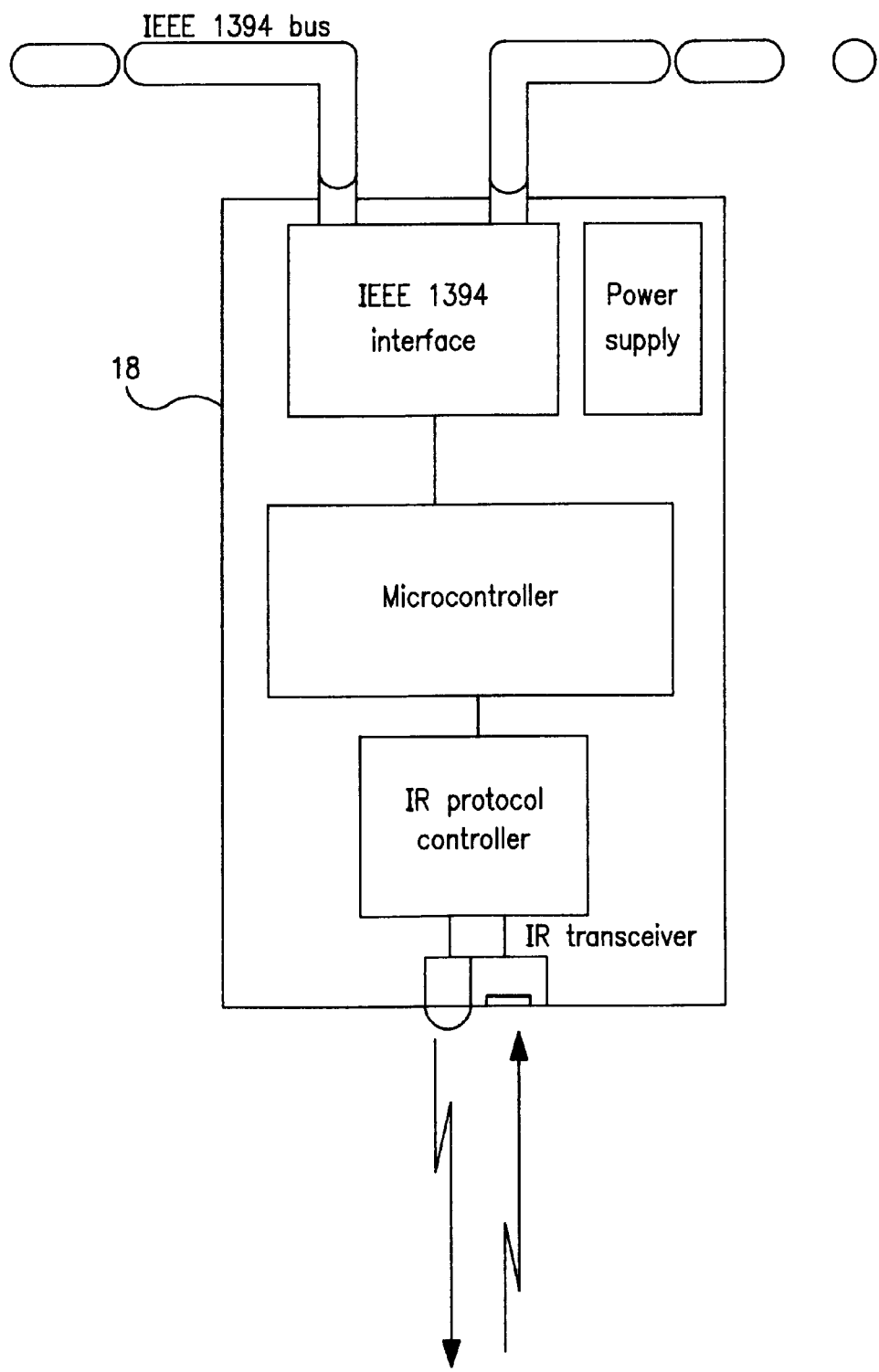
FIG. 2 is a sketch showing the inventive system wherein a remote control unit provides controls to a TV set and VCR.
Figure 5:
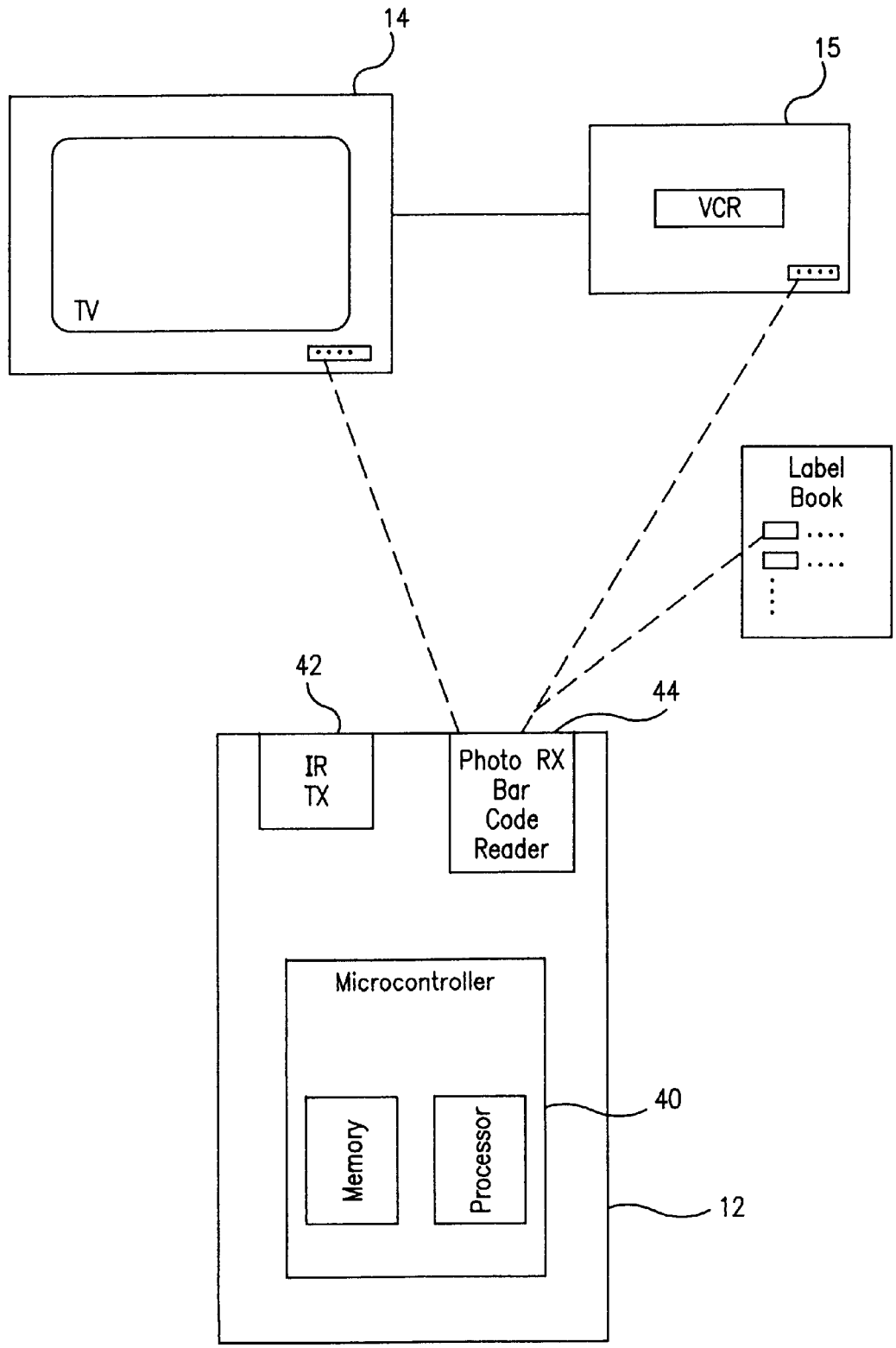
FIG. 5 is a mechanical arrangement of an inventive universal remote control unit with bar code setup capability.

FIG. 1 depicts the inventive system 11 wherein a universal remote control unit with bar code activated setup (hereinafter "universal remote control unit with BAS") capability 12 is positioned to control a TV set 14 and a VCR 15. FIG. 2 shows the universal remote control device with BAS 12 in more detail. The remote control 12 includes a microcontroller 19, an IR transmitter and a photosensitive receiver arranged as shown in FIG. 5, generally labeled as 20, various command keys generally labeled 16, including a key for initiating setup of the unit, all as is well known.

A consumer or user will purchase a new VCR 15 labeled in accordance with the invention to replace his old VCR 15 of any known brand. The inventive universal remote control system 11 instructions will direct the user to press a button or sequence of buttons on the remote control 12 (which will cause it to energize the IR LED and the bar code detector circuit and begin monitoring for valid bar code data) and then to swipe the remote control 12 across the bar code label on the device, after which the universal remote control unit 12 with BAS, which previously controlled the old VCR 15, now controls new VCR 15. In the preferred embodiment, the user initiates this state by pressing and holding a "setup" button for three seconds until the visible LED on the remote control 12 blinks twice, as shown in the flow chart of FIG. 6. However, it will be appreciated that other mechanisms (e.g. entering a sequence of keys, flipping a switch, etc.) may also be used to initiate said state. A VCR 15 is being referred to herein for purposes of explanation, however, it is to be understood that the invention relates to and is useful with a variety of other electronic devices or equipment as referred to above.

To explain in more detail, the bar code label on the device contains a data pattern which identifies:

a) the type of device it is; and b) the remote control encoding format to which it responds.

If the microcontroller 19 of remote control unit 12 detects a recognizable bar code pattern during the period the bar code reader circuit is enabled, it proceeds to analyze the identification data. If the VCR 15 type and requested IR format are supported by the remote control unit 12, the microcontroller 19 reconfigures its programming to match the new VCR 15. If the device or equipment is not supported by the remote control unit 12, the remote control simply remains unchanged in its previous configuration.

In standard preprogrammed universal remote controls, the user selects a transmission format by looking up a designation number for his device in a code list supplied with the remote control, and enters that designation number into the remote control. As becomes clear from the foregoing explanation, a principal object of the inventive system is to simplify the manner in which this designation number is communicated to the remote control unit 12. Once the designation number has been supplied to the remote control unit 12, the programming and mechanisms involved in this set-up process are well known in the art and need not be described in detail herein.

FIG. 5 shows the data frame layout. The data content of the bar code is a 32 bit value, utilized as shown in the following table:

| | | | | |
|---|---|---|---|---|
| 8 bits | System identification to allow possible future multiple versions of the system to co-exist without interfering with one another's settings. | | | |
| 4 bits | Device category | | | |
| | 00 | TV | 08 | CD player |
| | 01 | VCR | 09 | Amplifier |
| | 02 | Cassette tape | 10 | Tuner |
| | 03 | Laser disk | 11 | Home automation |
| | 04 | Digital audio tape | 12 | Misc. audio |
| | 05 | Cable box | 13 | Phonograph |
| | 06 | Satellite IRD | 14 | DVD |
| | 07 | Video Accessory | 15 | Spare |
| 12 bits | Device designation number, set-up code in the pre-programmed library. | | | |
| 8 bits | check byte (longitudinal parity of the preceding three bytes) | | | |

The data is encoded, most significant bit first, using bar code symbols as described below.

Figure 4:
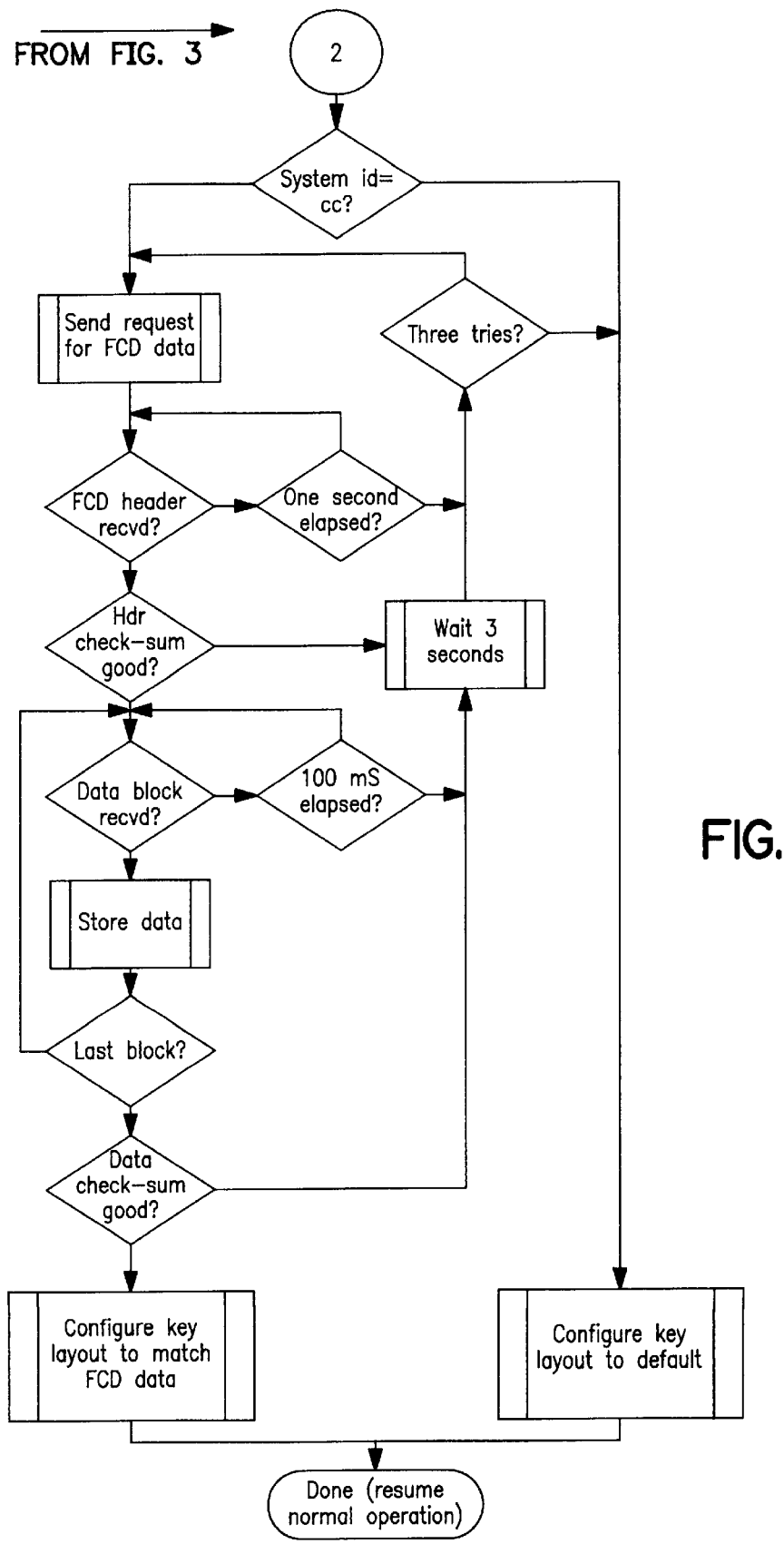
FIG. 4 is an example of the bar code.

FIG. 4 illustrates a 32-bit binary bar code-encoding example. Started from the left hand side, there is a start guard pattern represented by two extra-wide elements, then the 32-bit binary information follows the start guard pattern. A stop guard pattern with an extra-wide element, followed by a narrow element on the very right hand side concludes the bar code. A logic "1" bit is encoded as a wide element, while a logic "0" bit is encoded as a narrow element.

An extra-wide element is consisted of an extra-wide bar (3/16 in.) followed by a narrow space (1/16 in.). A wide element is consisted of a wide bar (1/8 in.) followed by a narrow space. The encoding scheme is a modified version of the standard 3 of 9 code (also referred to as Code 39).

Figure 3:
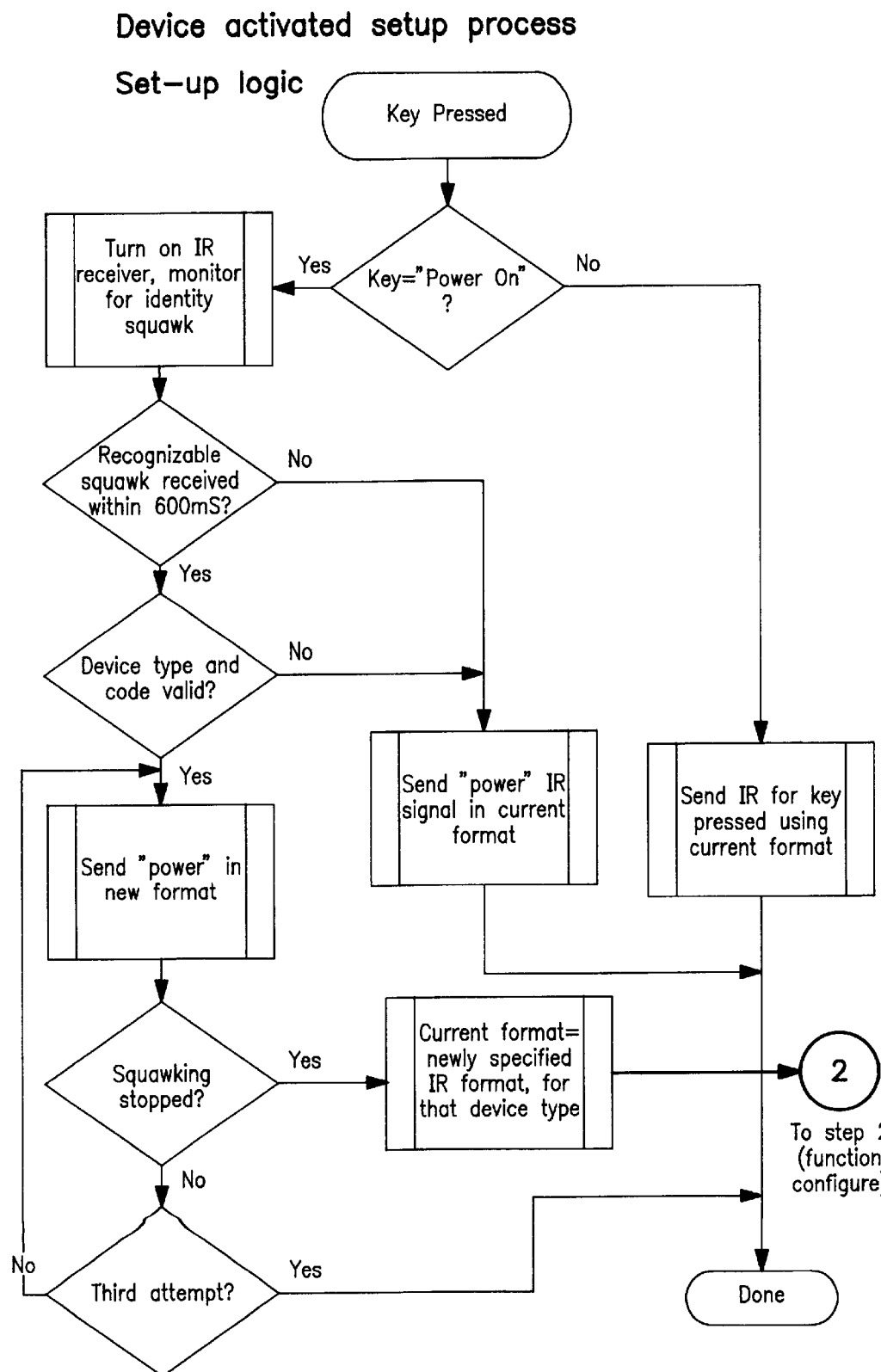
FIG. 3 is a circuit diagram (schematic) of the bar code reader circuit.

The 32-bit binary bar code-encoding example illustrated in FIG. 3 can be scanned from two directions (right to left or left to right) and a proper decoding scheme for the bar code scanner device can retrieve the binary information from the bar code.

In the example shown, it can thus be seen that the bar code represents the bit pattern 0100 0011 0100 1000 0100 0101 0100 1110 which according to the above bit assignment represents system 43, device type 4, device number 845, with even longitudinal parity.

This encoding format is one implementation, but other encoding schemes can be used to achieve the same result. In particular, a 32-bit number, including 8 bits of system identification is used in this example to maintain consistency of numbering with the device activated setup ("DAS") referenced in a corresponding application. In practice, the bar code data may be reduced to 24 bits or fewer with little negative impact in this application.

The mechanism used to read this bar code is described in the following. The IR emitting LED which is the same IR LED as is used during normal operation of the remote lights the bar code, which absorbs the light or reflects it back to a light-sensitive photodiode. A binary sequence of 1's or 0's may thus be represented by the widths of a series of reflective or non-reflective elements. The input signal to the bar code scanning circuitry is the reflected IR light from the bar code when the IR emitting LED illuminates the bar code. The output of the bar code scanning circuitry is logic one (1) which represents a reflective surface (white space) or logic zero (0) which represents a non-reflective surface (black bar).

In FIG. 3, the bar code scanning circuitry is illustrated. The bar code scanning circuitry comprises a photodiode D1 along with the parallel resistor R8 as the IR receiver to receive the reflected IR signal from the IR emitting LED D2. A reference voltage generator is formed with operational amplifier U1A and a resistor divider consisted of R3 and R4. A small gain amplifier is formed with U1B, R1 and R2. U1C, Q1, C1, R5, R6 and R7 form a maximum voltage detector. A voltage comparator is formed with operational amplifier U1D. The power switching circuitry is formed by transistor Q2 and resistor R9. The power switching circuitry is to turn on or turn off the power supply for the bar code scanning circuitry, under control of the microprocessor via the input signal labeled "Power Switch."

The operation of IR receiver is discussed below. Photodiode D1, together with resistor R8 as the IR receiver, is connected to the input of the small gain amplifier U1A. If the radiant intensity of the IR light to the PN junction of the photodiode has greater energy than the silicon's energy band gap of the photodiode, the electrons and holes diffuse in the PN junction will cause an open circuit voltage across the PN junction. Current flows through the junction in reverse direction if a load is connected across it. The amplitude of the current flow is proportional to the illuminance to the photodiode. Resistor R8 across D1 and the input impedance of operational amplifier U1A serve as the load for the photodiode. Resistor R8 reduces the total load resistance for the photodiode thus improves the photodiode's response speed. Resistor R8 also reduces the noise level to the input of the amplifier U1A.

The reference voltage generator is illustrated below. Operational amplifier U1B, along with the voltage divider consisting R3 and R4, are used as a reference voltage generator. The output of U1B is the reference voltage. This reference voltage is a fixed voltage level which value is the difference of the bar code scanning circuit's positive power supply Vcc minus 1.5 divided by 2. This calculation is based on the fact that the maximum output of the operational amplifier is 1.5 volt less than the positive power supply and this reference voltage will allow the operational amplifier to work in the small signal linear area. Assume that the positive power supply Vcc is 5 volt, then the reference voltage will be 1.7 volt. This reference voltage provides the virtual ground for the input of the amplifier U1A and the virtual ground of the comparator U1D. Comparator U1D will be discussed later. Notice that the cathode of the photodiode is connected to the virtual ground. Using the virtual ground instead of the actual ground allows amplifier U1A to work in the amplifier's linear area thus reduces the distortion of the IR input signal to the IR receiver.

The small gain amplifier U1A is discussed in the following. The ratio of the feedback resistor R1 and resistor R2 determines the voltage gain of the small gain amplifier U1A. As we have discussed above, the input signal to the bar code scanning circuitry is the reflected IR light when the IR emitting LED D2 scans the bar code. The input signal amplitude, in general, is proportional to the illuminance to the photodiode. More specifically, when the emitting IR LED lights the reflective surface (space), the input voltage to amplifier U1A is high; when the emitting IR LED lights the non-reflective surface (bar), the input voltage to amplifier U1A is low. The amplitude of the input signal is small (in the range of ten's of millivolt) and the amplifier U1A with the gain approximately about 20 is necessary to assure that the input signal after amplifier U1A has the amplitude about 1.5 v, and consequently, to assure that the output of the bar code scanning circuitry is logic zero (0) when scanning the bar code's reflective surface (space) or logic one (1) when scanning the bar code's non-reflective surface (bar).

The operation of the maximum voltage detector is now described. The maximum voltage detector consisted of operational amplifier U1C, transistor Q1, capacitor C1, and a few resistors. The output of the amplifier U1A is fed to the maximum voltage detector. The maximum voltage detector detects the peak of the output of amplifier U1A by using the voltage follower U1C and the charge-discharge circuitry consisted of Q1, C1, R5, R6 and R7. R5, R6 and R7 also serve as the voltage divider to provide the reference voltage for the comparator U1D and will be discussed later. The positive input of U1C is connected to the output of amplifier U1A. The negative input of U1C is connected to the charge-up capacitor C1. Transistor Q1 provides the current source for the charge-up capacitor C1. The discharge circuitry comprises of C1, R5, R6 and R7.

When a peak signal appears (a signal transition from low to high) at the output of amplifier U1A, capacitor C1 is quickly charged up to the signal peak level because the current source from transistor Q1 provides sufficient current for it. Notice that transistor Q1 is turned on when a peak signal is detected at the positive input of U1C because the output of U1C is connected to the base of the transistor Q1 and the negative input of U1C is connected on the emitter of transistor Q1. Thus a signal transition from low to high at the positive input of U1C causes transistor Q1 to be turned on. A signal transition from high to low at the positive input of U1C causes transistor Q1 to be turned off. On the other hand, when a signal transition from high to low is detected at the positive input of U1C, capacitor is discharged slowly because the discharge path is provided through C1, R5, R6 and R7 and the discharge time constant is about the range of 10 second. In this way, the voltage level of the charge-up capacitor C1 always maintains the signal's peak level from the output of amplifier U1A. The voltage level of the charge-up capacitor C1 is the output of the maximum voltage detector. Notice that the output of amplifier U1A is also connected to the positive input of the comparator U1D as the comparator's input voltage.

The configuration and operation of comparator U1D is described below. When the voltage level at the positive input of U1D (V+(U1D)) is less than the voltage level at the negative input of UlD (V−(U1D)), the output voltage of U1D is low or logic zero (0). On the other hand, when V+(U1D) is higher than V−(U1D), the output voltage is high or logic one (1). As have discussed in the reference voltage generator session above, the reference voltage generator provides the virtual ground of about 1.7 volt for the comparator U1D. R5, R6 and R7 are served as the voltage divider to provide the reference voltage for the comparator U1D. The middle point of this voltage divider is the reference voltage and is connected to the negative input of comparator U1D. This provides the reference voltage. The ratio of this reference voltage level to the voltage level of the charge-up capacitor C1 is determined by the ratio of the average voltage level between output high of amplifier U1A (when the scanner lights the reflective surface (space)) and output low of amplifier U1A (when the scanner lights the non-reflective surface (bar)) to the voltage level of output high of amplifier U1A. This ratio is about seventy-six percent. This means that assume that the output high for amplifier U1A is 1.0 volt, the output low for amplifier U1A is 0.52 volt, and the average voltage level between output high and output low of amplifier U1A will be 0.76 volt and this ratio number of seventy-six percent is used to determine the ratio of the value of resistor R6 to the value of resistor R6 plus the value of the parallel of resistor R5 and R7.

In particular, the configuration and operation of comparator U1D is to assure that the comparator is working as a virtual zero-crossing detector where the virtual zero voltage is provided by the reference voltage which is the middle point of the voltage divider comprising of R5, R7 and R6. When the positive input of the comparator U1D higher than the virtual zero voltage, the output of the comparator is logic one (1). When the positive input of the comparator U1D lower than the virtual zero voltage, the output of the comparator is logic zero (0). Notice that the positive input or the input of comparator U1D is connected to the output of the small gain amplifier U1A. Further more, the configuration and operation of comparator U1D is also to assure that when the bar code scanner device with this bar code scanning circuitry scans at the reflected surface (space), the device's output will be logic one (1). When the device scans at the non-reflected surface (bar), the device's output will be logic zero (0).

The IR emitting circuitry is illustrated in FIG. 2 and is formed by the IR emitting LED D2, transistor Q3 and resistor R22. The IR emitting circuitry illuminates the bar code for photodiode D1. The IR emitting circuitry is already a part of the regular Universal Remote Control and is shown here for clarify only. Transistor Q3 is used as the switch to turn on or turn off the IR emitting circuitry, under control of the microprocessor via the input signal "IR emitter on/off."

It is also important to note that the bar code may be located other than on the device itself: it may for example appear on the carton in which the device is packaged, or in the user manual supplied with the device, or even in the user manual supplied with the remote control.

While the invention has been particularly shown and described with reference to a particular embodiment thereof it will be understood by those skilled in the art that various changes in form and detail may be made therein without departing from the spirit and scope of the invention.

What is claimed is:

1. A device for controlling an identifiable consumer electronic component, the device comprising:

a memory having stored therein a plurality of command sets, each command set having a plurality of commands that control the operation of a consumer electronic component;

a plurality of command keys each being activatable to cause the device to transmit to a consumer electronic component at least one command selected from the plurality of commands of the plurality of command sets stored in the memory;

a reader for reading information from a label that contains information identifying the identifiable consumer electronic component; and a microcontroller in communication with the reader programmed to cause commands selected from the plurality of commands of the plurality of command sets stored in the memory to be mapped to selected command keys, the mapping being performed as a function of the information read from the label of the identifiable consumer electronic component such that activation of the selected command keys causes the device to issue the appropriate commands to command the operation of the identifiable consumer electronic component.

2. A method of configuring a remote control comprising:

electronically reading information that identifies a consumer electronic component;

selecting a command set having a plurality of commands from a plurality of command sets stored in a memory resident on the remote control as a function of the electronically read identification information; and mapping the commands from the selected command set to selected command keys on the remote control whereby the remote control is configured such that activation of the selected command keys causes the device to issue the appropriate commands to command the operation of the consumer electronic component.

3. A computer readable medium having instruction for configuring a remote control, the instructions performing the steps comprising:

electronically reading information that identifies a consumer electronic component;

selecting a command set having a plurality of commands from a plurality of command sets stored in a memory resident on the remote control as a function of the electronically read identification information; and mapping the commands from the selected command set to selected command keys on the remote control whereby the remote control is configured such that activation of the selected command keys causes the device to issue the appropriate commands to command the operation of the consumer electronic component.

* * * * *

UNITED STATES PATENT AND TRADEMARK OFFICE
CERTIFICATE OF CORRECTION

PATENT NO.    : 6,225,938 B1
DATED         : May 1, 2001
INVENTOR(S)   : Patrick H. Hayes et al.

It is certified that error appears in the above-identified patent and that said Letters Patent is hereby corrected as shown below:

Please delete the specification beginning with column 1, line 3, ending with column 6, line 46, and substitute the attached corrected specification.

Signed and Sealed this

Eighth Day of October, 2002

Attest:

Attesting Officer

JAMES E. ROGAN
Director of the United States Patent and Trademark Office

UNIVERSAL REMOTE CONTROL SYSTEM
WITH BAR CODE SETUP

BACKGROUND OF THE INVENTION

This invention relates generally to infrared remote control systems and, more particularly, to universal remote control units wherein one remote control unit can control a number of various types of devices such as televisions, video cassette recorders (VCRs), cable boxes, disk players and other electronic equipment. The invention provides an improvement to such universal remote control systems for enabling the devices and remote control unit to be ready to communicate with each other.

Most manufacturers provide remote controls to control their equipment, and equipment of different manufacturers are often controlled with different remote control units. To minimize the number of individual remote control units a user requires, universal remote control units have been developed. Accordingly, infrared remote control units for controlling various functions of television receivers, VCR's, and auxiliary electronic equipment have become quite widespread in recent years. U.S. Patent No. 5,255,313 issued to Darbee and assigned to Universal Electronics Inc., and U.S. Patent No. 5,552,917 issued to Darbee et al and assigned to Universal Electronics Inc. disclose universal remote control systems.

In a common method of setting up and using a universal remote control unit, infrared ("IR") function codes that are to be learned and used are made available from the device to be controlled. The consumer or user is required to program or adapt the universal remote control unit to control the user's particular equipment, such as television sets, VCR's, entertainment media, and other devices. Alternatively, codes can be preprogrammed into the remote control to communicate with the equipment to be controlled. In either case, the programming and adaption of the universal remote control to the user's particular equipment can be demanding, exacting and generally frustrating for many users.

SUMMARY OF THE INVENTION

This invention provides a universal remote control system wherein the equipment to be controlled and the associated remote control unit are preprogrammed and adapted to automatically configure or reconfigure the remote control unit to communicate with the equipment to be controlled by means of a label on the equipment to be controlled, e.g. a bar code, is used to perform the setup of the remote control.

The foregoing features and advantages of the present invention will be apparent from the following more particular description of the invention. The accompanying drawings, listed hereinbelow, are useful in explaining the invention.

BRIEF DESCRIPTION OF THE DRAWINGS

Figure 6:
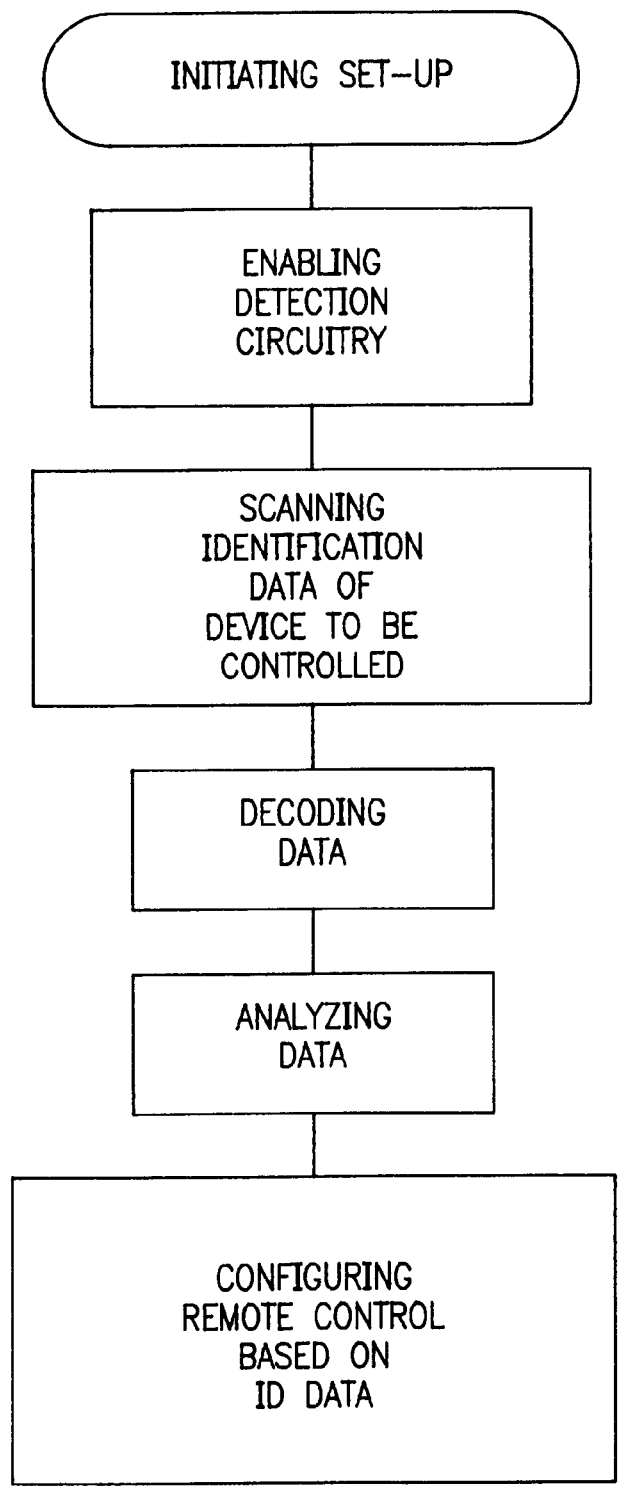
FIG. 6 is an updated flow chart of the inventive system.

Fig. 1 is a device-activated system (DAS) comprising a remote control interface;

Fig. 2 is an enlarged view of the remote control interface shown in Fig. 1;

Figs. 3 and 4 show a DAS flowchart for configuring a remote control;

Fig. 5 shows a remote control comprising a photosensitive receiver connected to a microcontroller; and Fig. 6 is a flow chart for setting up a remote control according to the invention.

DESCRIPTION OF THE INVENTION

The present invention relates to a universal remote control system with bar code activated setup capability. As stated above, universal remote control units are prevalent in the market place. Each of these remote control units are used to control various types and brands of electronic devices (equipment) in the consumer's or user's home such as the TV, the VCR, cable box, disk player, etc. However, the prior art universal remote control systems have to be programmed or adapted by the user to control his particular equipment. Often this programming and adaptation becomes quite difficult and frustrating to the user. Figs. 1-4 depict methods and apparatus for achieving device-activated setup. As stated above, the present invention is directed to providing a variation of the DAS system wherein the devices to be controlled and the remote control unit are readied to enter into communication with each other by means of the user "swiping" the remote control over a label on the device, without requiring the user to program or code in a set of commands; that is, the remote control unit can be setup rapidly and with minimal effort on the part of the user.

Fig. 5 depicts a universal remote control unit 12 with bar code activated setup (hereinafter "universal remote control unit with BAS") capability. The unit 12 is positioned to control a TV set 14 and a VCR 15. The remote control 12 includes a microcontroller 40, an IR transmitter 42 and a photosensitive receiver 44. The remote control 12 may generally include various command keys including a key for initiating setup of the unit, all communication keys are well known.

A consumer or user will purchase a new VCR 15 labeled in accordance with the invention to replace his old VCR 15 of any known brand. The inventive universal remote control will direct the user to press a button or sequence of buttons on the remote control 12 (which will cause it to energize the IR LED and the bar code detector circuit and begin monitoring for valid bar code data); then to swipe the remote control 12 across the bar code label on the device. After the universal remote control unit 12 with BAS, which previously controlled the old VCR 15, has processed the data, it will now be able to control the new VCR 15. In the preferred embodiment, the user initiates this state by pressing and holding a "setup" button for three seconds until the visible LED on the remote control 12 blinks twice. However, it will be appreciated that other mechanisms (e.g. entering a sequence of keys, flipping a switch, etc.) may also be used to initiate said state. A VCR 15 is being referred to herein for purposes of explanation, however, it is to be understood that the invention relates to and is useful with a variety of other electronic devices or equipment as referred to above.

To explain in more detail, the bar code label on the device contains a data pattern which identifies:

a) the type of device it is; and b) the remote control encoding format to which it responds.

If the microcontroller 40 of remote control unit 12 detects a recognizable bar code pattern during the period the bar code reader circuit is enabled, it proceeds to analyze the identification data. If the VCR 15 type and requested IR format are supported by the remote control unit 12, the microcontroller 40 reconfigures its programming to match the new VCR 15. If the device or equipment is not supported by the remote control unit 12, the remote control simply remains unchanged in its previous configuration.

In standard preprogrammed universal remote controls, the user selects a transmission format by looking up a designation number for his device in a code list supplied with the remote control, and enters that designation number into the remote control. As becomes clear from the foregoing explanation, a principal object of the inventive system is to simplify the manner in which this designation number is communicated to the remote control unit 12. Once the designation number has been supplied to the remote control unit 12, the programming and mechanisms involved in this set-up process are well known in the art and need not be described in detail herein.

The data content of the bar code is typically a 32 bit value, utilized as shown in the following table:

| | | | | | |
|---|---|---|---|---|---|
| 8 bits | System identification to allow possible future multiple versions of the system to co-exist without interfering with one another's settings. | | | | |
| 4 bits | Device category | | | | |
| | 00 | TV | 08 | CD player | |
| | 01 | VCR | 09 | Amplifier | |
| | 02 | Cassette tape | 10 | Tuner | |
| | 03 | Laser disk | 11 | Home automation | |
| | 04 | Digital audio tape | 12 | Misc. audio | |
| | 05 | Cable box | 13 | Phonograph | |
| | 06 | Satellite IRD | 14 | DVD | |
| | 07 | Video Accessory | 15 | Spare | |
| 12 bits | Device designation number, set-up code in the pre-programmed library. | | | | |
| 8 bits | check byte (longitudinal parity of the preceding three bytes) | | | | |

The data is encoded, most significant bit first, using bar code symbols as described below.

A 32-bit binary bar code-encoding example will be described. Started from the left hand side, there is a start guard pattern represented by two extra-wide elements, then the 32-bit binary information follows the start guard pattern. A stop guard pattern with an extra-wide element, followed by a narrow element on the very right hand side concludes the bar code. A logic "1" bit is encoded as a wide element, while a logic "0" bit is encoded as a narrow element.

An extra-wide element is consisted of an extra-wide bar (3/16 in.) followed by a narrow space (1/16 in.). A wide element is consisted of a wide bar (1/8 in.) followed by a narrow space. The encoding scheme is a modified version of the standard 3 of 9 code (also referred to as Code 39).

The 32-bit binary bar code-encoding example can be scanned from two directions (right to left or left to right) and a proper decoding scheme for the bar code scanner device can retrieve the binary information from the bar code.

In the example described it can thus be understood that the bar code represents the bit pattern 0100 0011 0100 1000 0100 0101 0100 1110 which according to the above bit assignment represents system 43, device type 4, device number 845, with even longitudinal parity.

This encoding format is one implementation, but other encoding schemes can be used to achieve the same result. In particular, a 32-bit number, including 8 bits of system identification is used in this example to maintain consistency of numbering with the device activated setup ("DAS") referenced in a corresponding application. In practice, the bar code data may be reduced to 24 bits or fewer with little negative impact in this application.

The mechanism used to read this bar code is described in the following. The IR emitting LED which is the same IR LED as is used during normal operation of the remote lights the bar code, which absorbs the light or reflects it back to a light-sensitive photodiode. A binary sequence of 1's or 0's may thus be represented by the widths of a series of reflective or non-reflective elements. The input signal to the bar code scanning circuitry is the reflected IR light from the bar code when the IR emitting LED illuminates the bar code. The output of the bar code scanning circuitry is logic one (1) which represents a reflective surface (white space) or logic zero (0) which represents a non-reflective surface (black bar).

The bar code scanning circuitry comprises a photodiode along with a parallel resistor as the IR receiver to receive the reflected IR signal from the IR emitting LED. A reference voltage generator is formed with operational amplifier and a resistor divider. A small gain amplifier is formed as is a maximum voltage detector. A voltage comparator is formed and power switching circuitry is formed with a transistor and a resistor. The power switching circuitry is used to turn on or turn off the power supply for the bar code scanning circuitry, under control of the microprocessor.

The operation of IR receiver is discussed below. The Photodiode, together with resistor the IR receiver, is connected to the input of the small gain amplifier. If the radiant intensity of the IR light to the PN junction of the photodiode has greater energy than the silicon's energy band gap of the photodiode, the electrons and holes diffuse in the PN junction will cause an open circuit voltage across the PN junction. Current flows through the junction in reverse direction if a load is connected across it. The amplitude of the current flow is proportional to the illuminance to the photodiode. The Resistor across the diode, and the input impedance of operational amplifier, serve as the load for the photodiode. The Resistor reduces the total load resistance for the photodiode and thus improves the photodiode's response speed. The Resistor also reduces the noise level to the input of the amplifier.

The IR emitting circuitry illuminates the bar code for photodiode. The IR emitting circuitry is already a part of the regular Universal Remote Control. A Transistor is used as the switch to turn on or turn off the IR emitting circuitry, under control of the microprocessor via the input signal "IR emitter on/off."

It is also important to note that the bar code may be located other than on the device itself: it may for example appear on the carton in which the device is packaged, or in the user manual supplied with the device, or even in the user manual supplied with the remote control.

While the invention has been particularly shown and described with reference to a particular embodiment thereof it will be understood by those skilled in the art that various changes in form and detail may be made therein without departing from the spirit and scope of the invention.

5   Abstract:

A universal remote control system with bar code activated set up wherein the device to be controlled such as a TV, VCR or other consumer electronic product, and the associated remote control unit are pre-programmed and adapted to automatically reconfigure the remote control unit to communicate with a device to be controlled.

10